US006921293B2

(12) United States Patent
Takada et al.

(10) Patent No.: US 6,921,293 B2

(45) Date of Patent: Jul. 26, 2005

(54) CONNECTOR STRUCTURE

(75) Inventors: Syoichi Takada, Kanagawa (JP); Satoru Kihira, Kanagawa (JP); Kiyoshi Washino, Kanagawa (JP); Tsuyoshi Fukami, Kanagawa (JP); Masato Kato, Kanagawa (JP)

(73) Assignee: J.S.T. Mfg. Co. Ltd., Osaka (JP)

( * ) Notice: Subject to any disclaimer, the term of this patent is extended or adjusted under 35 U.S.C. 154(b) by 8 days.

(21) Appl. No.: 10/428,029

(22) Filed: May 2, 2003

(65) Prior Publication Data

US 2004/0127093 A1 Jul. 1, 2004

(30) Foreign Application Priority Data

May 7, 2002 (JP) ....................................... 2002-131630

(51) Int. Cl.[7] .............................................. H01R 13/627

(52) U.S. Cl. ........................ 439/582; 439/352; 439/521

(58) Field of Search ................................ 439/582, 468, 439/466, 675, 689, 352, 934, 521

(56) References Cited

U.S. PATENT DOCUMENTS

| | | | | |
|---|---|---|---|---|
| 5,647,757 A | * | 7/1997 | Chrysostomou | 439/352 |
| 5,697,806 A | * | 12/1997 | Whiteman et al. | 439/417 |
| 6,077,101 A | * | 6/2000 | Garretson et al. | 439/352 |
| 6,224,428 B1 | * | 5/2001 | Chen et al. | 439/694 |
| 6,250,952 B1 | * | 6/2001 | Shiga et al. | 439/466 |
| 6,276,953 B1 | * | 8/2001 | Gauker et al. | 439/352 |
| 6,371,794 B1 | | 4/2002 | Bauer et al. | |
| 6,551,137 B2 | * | 4/2003 | Pfaff et al. | 439/607 |

FOREIGN PATENT DOCUMENTS

| | | |
|---|---|---|
| EP | 0 556 979 A2 | 8/1993 |
| EP | 0 765 007 A2 | 3/1997 |
| EP | 0 765 007 A3 | 7/1998 |
| EP | 1 009 063 A2 | 6/2000 |
| EP | 1 009 063 A3 | 9/2000 |
| EP | 0 556 979 A3 | 9/2003 |
| JP | 09-167660 A1 | 6/1997 |
| JP | 10-1067000 A1 | 4/1998 |
| JP | 10-189181 A1 | 7/1998 |
| JP | 11-204214 A1 | 7/1999 |
| JP | 2000-21525 A1 | 1/2000 |
| JP | 2000-106237 A1 | 4/2000 |
| JP | 2000-260507 A1 | 9/2000 |
| JP | 2000-15536 A1 | 11/2000 |
| JP | 2001-15196 A1 | 1/2001 |
| JP | 2001-22908 A1 | 1/2001 |
| JP | 2001-35576 A1 | 2/2001 |
| JP | 2001-118984 A1 | 4/2001 |
| JP | 2001-143785 A1 | 5/2001 |
| JP | 2001-296708 A1 | 10/2001 |
| JP | 2000-315535 A1 | 11/2001 |
| JP | 2001-332355 A1 | 11/2001 |

(Continued)

OTHER PUBLICATIONS

European Search Report dated Sep. 1, 2003.

*Primary Examiner*—Hien Vu

(74) *Attorney, Agent, or Firm*—Rader, Fishman & Grauer PLLC

(57) ABSTRACT

In a connector with a cover or door body, it is a purpose of the present invention to provide a connector and a connector main body of the connector of difficulty being broken into parts when the connector is under use for being plugging in or pulling off although it is possible to detach the cover with ease. It is characterized in that a direction of force to widen a second opening (18) from which a cable (20) of the connector (10) is drawn out is different from a direction of detaching the cover (14) from the housing main body (12). The detaching direction may be a sliding direction on the housing main body (12). Moreover, it is characterized in that a direction of force to widen the opening (18) is substantially orthogonal to the detaching direction of the cover (14) from the housing main body (12).

22 Claims, 8 Drawing Sheets

150 147 142 148 143 143 144 138 118 117 127 136 151 137 111 152 101

152 151 101 103 104 102 101a

FOREIGN PATENT DOCUMENTS

| | | | |
|---|---|---|---|
| JP | 2001-332356 | A1 | 11/2001 |
| JP | 2002-252067 | A1 | 9/2002 |
| JP | 2000-299167 | A1 | 10/2002 |
| JP | 2002-298993 | A1 | 10/2002 |
| JP | 2002-298995 | A1 | 10/2002 |
| JP | 2002-319441 | A1 | 10/2002 |
| JP | 2003-92171 | A1 | 3/2003 |
| JP | 2003-100393 | A1 | 4/2003 |
| JP | 2003-197312 | A1 | 7/2003 |

* cited by examiner 50
54
28
22
20
28
21
52
16

60
66
68
d
c
64
b
20
a
62
18
16

CONNECTOR STRUCTURE

CROSS-REFERENCE TO RELATED APPLICATIONS

This application is based upon and claims the benefit of priority from the prior Japanese Patent Application No. 2002-131630, filed May 7, 2002, the entire contents of which are incorporated herein by reference. This application is related to co-pending United States patent application entitled "Electric Jack" filed on even date herewith. That co-pending application is also expressly incorporated herein by reference.

BACKGROUND OF THE INVENTION

1. Field of the Invention

The present invention relates to a structure of a connector or a connector main body, and more specifically, the structure of the connector or the connector main body in which a door body or a housing part covers an opening of a housing main body.

2. Background Art

A conventional connector 900 transmitting an electric signal or the like is shown in FIGS. 12 and 13. The connector 900 is composed of a housing main body 902, a contact 910 connected to an outside terminal, a cover 904 for covering the housing main body to make the connector 900, and a coaxial cable 912 to transmit a signal from outside. Along a guide 914 attached slightly inwardly on the side of the housing main body 902, the cover 904 is assembled to cover over the housing main body 902 to constitute the connector 900. In this instance, the housing main body 902 and the cover 904 are fixed by fitting the cover 904 to the guide 914 without welding, adhesion or the like so that the connection of the cable within the connector can be performed any time and easily. The coaxial cable 912 is drawn out from the inside of the connector 900 through an opening 906 formed by the combination of a semicircular opening **906*a* of the housing main body 902 and a semicircular opening 906*b* of the cover 904**.

However, in the connector having such a housing structure, especially, when the connector 900 is pulled out from an outside terminal or when the cable is drawn for setting-up, the cable 912 may be pulled and a separating force to detach the cover 904 from the housing main body could be applied depending on the pulling direction. Thus, the connector 900 may be broken into parts. That is to say, when the cable 912 is drawing upward in the drawings, an upward force acts on the cover side **906*b* of the opening 906 and thereby the cover 904 of the housing main body 902 is forcibly opened. To prevent it, a lock 914 may be made larger in order to raise locking force of the housing 902** or application area of the lock. However, this may make assembling workability worse and the connector main body too large. Moreover, the cover with such structure may not be opened again without breaking the connector once it is closed.

In view of a difficulty such as the above, a purpose of the present invention is to provide a connector which may not be broken into parts during plugging and unplugging of the connector and provide the connector or a connector main body of the connector from which the cover can be easily detached after the cover is attached to the connector or the connector main body.

In view of such difficulty as described above, a cause of the connector resolution was studied to find that it plausible that a force opening the opening 906 (i.e., the force pushing a semicircular opening **906*a* and another semicircular opening 906*b* up and down to widen the opening 906) acts during plugging the connector or the like. Since an operator may hold the connector 900 together with the cable 912 or only the cable 912 without holding both housing main body and the cover to move the cable 912 right-and-left and up-and-down relating to the assembly comprising the housing main body and the cover. In other words, a force direction contained in the plane, on which the opening 906 being composed of the housing main body and the cover, widens the opening 906** to separate the cover from the assembly.

SUMMARY OF THE INVENTION

Thus, in the present invention, it is characterized in that the direction of force that widens such opening is different from a direction taking off the cove from the housing main body. On the other hand, it is characterized in that the direction of force widening such opening is substantially orthogonal to a direction of removing the cover from the housing main body. Moreover, it is characterized in that the direction of force widening such opening is different from a direction putting the cover on the housing main body. On the other hand, it is characterized in that the direction of force to widen such opening is substantially orthogonal to the direction putting the cover on the housing main body.

More concretely, the present invention provides the followings.

(1) A connector main body for making a connector having a first opening for receiving an outside terminal, comprising a housing main body and a door body covering the housing main body to make the connector; wherein the housing main body includes: the first opening which is opened as corresponding to a size and a shape of the outside terminal to be connected and which a contact being contact with the outside terminal is exposed to; a second opening from which a first lead wire is drawn out to be connected to the contact, and; a third opening which communicates with the second opening and which is to be covered with the door body and; wherein a moving direction of the door body, when the door body covers the housing main body by moving the door body to close the third opening, is different from a direction where the first lead wire being drawn out from the second opening moves flexibly.

(2) The connector main body according to (1), wherein the housing main body has a first convex or end portion which slides in a first concave portion being provided on the door body.

(3) The connector main body according to (1) or (2), wherein the housing main body has a second concave portion in which a second convex or end portion being provided on the door body slides.

(4) The connector main body according to any one of (1) to (3), wherein the housing main body comprises a fourth opening being separated from the second opening by a partition wall and communicating with the third opening; wherein the contact is connected with a second lead wire being drawn out from the fourth opening; wherein a moving direction of the second lead wire moving flexibly conforms with the direction where the first lead wire being drawn out from the second opening moves flexibly and; wherein the partition wall has a third concave portion in which a third convex or end portion of the door body slides when the door body covers the housing main body.

(5) The connector main body according to any one of (1) to (3), wherein the housing main body comprises a fourth opening being separated from the second opening by a partition wall and communicating with the third opening; wherein the contact is connected with a second lead wire being drawn out from the fourth opening; wherein a direction of the second lead wire moving flexibly conforms with the direction where the first lead wire being drawn out from the second opening moves flexibly and; wherein the partition wall has a fourth convex or end portion which slides in a fourth concave portion of the door body when the door body covers the housing main body.

(6) The connector main body according to any one of (1) to (5), wherein the housing main body has a stopping portion for stopping the door body when the door body covers the housing main body.

(7) A connector main body for making a connector having a first opening for receiving an outside terminal, comprising a housing main body and a housing part covering the housing main body to make the connector; wherein the housing main body has a second opening from which a first cable is drawn out and a third opening communicating with the second opening and; wherein a moving direction of the housing part, when the housing part covers the housing main body by moving the housing part to close the third opening being, is substantially orthogonal to a direction in which the second opening is widened.

(8) The connector main body according to (7), wherein the housing main body has a fifth convex or end portion which slides in a fifth concave portion being provided on the housing part.

(9) The connector main body according to (7) or (8), wherein the housing main body has a sixth concave portion in which a sixth convex or end portion being provided on the housing part slides.

(10) The connector main body according to any one of (7) to (9); wherein the housing main body comprises a fourth opening being separated from the second opening by a partition wall and communicating with the third opening, from the fourth opening a second lead wire being drawn out to be connected to the contact; Wherein a direction in which the fourth opening is widened conforms with the direction in which the second opening is widened; and wherein the partition wall has a seventh concave portion in which a seventh convex or end portion of the housing part slides when the housing part covers the housing main body.

(11) The connector main body according to any one of (7) to (9); wherein the housing main body comprises a fourth opening being separated from the second opening by a partition wall and communicating with the third opening, from the fourth opening a second lead wire being drawn out to be connected to the contact; Wherein a direction in which the fourth opening is widened conforms with the direction in which the second opening is widened; and wherein the partition wall has an eighth convex or end portion which slides in an eighth concave portion of the housing part when the housing part covers the housing main body.

(12) The connector main body according to any one of (7) to (11), wherein the housing main body has a stopping portion for stopping the housing part when the housing part covers the housing main body.

(13) A connector main body for making a connector having a first opening for receiving an outside terminal, the connector main body comprising a housing main body and a housing part for covering the housing main body to make the connector; wherein the housing main body has a second opening from which a cable to be connected to the contact is drawn out and; wherein a moving direction in which the housing part moves, when the housing part covers the housing main body, is substantially orthogonal to a separating direction for separating the cable from the contact to be contact with the outside terminal, the separating direction passing through a predetermined dividing plane positioned between the contact and the cable.

(14) A connector main body for making a connector having a first opening for receiving an outside terminal, the connector main body comprising a housing main body and a housing part for covering the housing main body to make the connector; wherein the housing main body includes a second opening from which a cable is drawn out and a third opening which is to be covered with the housing part, the second opening being separated from the third opening; wherein the housing part covers the housing main body by closing the third opening.

(15) The connector main body according to any one of (1) to (6), or (13); wherein the housing main body is a box-shaped hexahedron body; wherein the contact is arranged on a first face thereof; wherein the second opening is arranged on a second face thereof and; wherein the third opening is arranged on a third face thereof.

(16) A connector having the connector main body according to any one of (1) to (6), (13) or (15); wherein the contact, when the connector is connected to the outside terminal, is mechanically restrained by the outside terminal, and the housing main body is mechanically restrained by the outside terminal through the contact.

(17) A connector for connecting to an outside terminal, the connector comprising a contact to be connected to the outside terminal, a housing main body, and a housing part for covering the housing main body to make the connector; wherein a moving direction of the housing part, when the housing part covers the housing main body by closing an opening provided on the housing main body, is substantially orthogonal to a pulling direction for unplugging the connector from the outside terminal.

Here, the outside terminal refers to any terminals to which the connector according to the present invention is connected. The terminal may exist independently from the connector and include any kinds of terminals such as a power supply terminal, an outlet, a jack, a plug and so on. Further, the plugging may mean that a connector is connected or plugged according to a purpose of the terminal, for example, it may be a connection or plugging for transmitting a power supply, an electric signal or the like. The connector main body may include a part of the connector so that it may refer to a body forming the connector such as a housing, a case, a frame and the like. Therefore, another part may be put together with the connector main body to make the connector. The housing main body is a main part of the housing so that it may refer to a case and that it may be put together with another part to form the housing. Covering the housing main body may mean that the housing main body has an opening, which is to be covered. Therefore, covering the housing main body to make the connector may mean that the connector is completed by covering the opening at a final stage or some stage near the final stage. The door body may comprise a part covering the housing main body and have a plate-shape or a similar shape to the plate.

The opening of the housing main body may correspond to the size and shape of the outside terminal to be connected. Therefore, the housing main body may have a portion with an opening and the size of the opening part is formed to match the size and shape of the outside terminal to be connected. The opening may mean that there is no obstacle in that part so that the outside terminal can enter the housing main body through it. The contact contacting with the outside terminal may mean that the contact makes the contact (mechanical contact may be included) that can transmit electricity, a signal, information or other contents (substance and energy such as force and light may be included) to be transmitted between the connector and the outside terminal. A contact to be electrically contacted may be included. The contact may be a terminal contact to make contact as described above and may include an electric terminal. By way of example, a so-called contact and a so-called terminal may be included. The first opening where the contact is exposed may be characterized in that the contact as stated above can be connected to the outside terminal. Therefore, the contact may be physically exposed through the opening or be covered with a kind of cover applied to the opening. The opening has the meaning as stated above, and naming of "the first opening" is to distinguish it from another opening.

The second opening from which the lead wire is drawn out may be an opening where the lead wire for conducting the electric signals etc., which a connector transmits by plugging, comes out of the inside of the connector, and naming of "the second" is to distinguish it from the first opening. Covering the housing main body by closing the third opening communicating with the second opening may mean that the third opening spatially communicating with the second opening exists in the housing main body, and is covered by the door body. That is to say, it is acceptable that the door body covers the housing main body so as to contact with the second opening or to approach it. The direction of movement of the door body when it covers the housing main body may be a moving direction of the door body closing the third opening so as to cover the housing main body or a moving direction of the door body being mounted. The direction in which the lead wire moves flexibly may be the direction which is substantially parallel to the plane made by the second opening and any directions substantially contained in the plane defined by a periphery defining the second opening included in the housing main body. Therefore, the direction may be any directions within the plane. That the moving direction of the door body is different from the flexibly-moving direction as described above may mean that the moving direction of the door body covering the housing main body is not identical to the flexibly-moving direction.

The first concave portion provided on the door body, for example, may be a concave portion having a groove-like shape in the door body, and a convex portion or the like described later can be fitted in a retreat or recess portion of the concave portion. That the first convex portion or end portion of the housing main body slides in the aforementioned first concave portion may mean that a convex portion (a projecting portion from surroundings) or an end portion provided near the third opening of the housing main body is fitted in the retreat position of the aforementioned first concave portion and may smoothly move in the concave portion. In this instance, the first concave portion, the first convex portion or the end portion may be continuous, or discontinuous in one direction (in the discontinuous instance, the first concave portion, or the first convex portion or end portion may comprise a plurality of separate parts), moreover, it may have a predetermined length.

The second concave portion provided on the housing main body, for example, may be a concave portion of a groove-like shape of the housing main body, and a convex portion or the like described later can be fitted in a retreat or recess portion of the concave portion. That the second convex portion or the end portion of the door body slides in the aforementioned second concave portion provided near the third opening may mean that the convex portion (a projecting portion from surroundings) or an end portion of the door body is fitted in the retreat position of the aforementioned second concave portion and may smoothly move in the concave portion. In this instance, the second concave portion, the second convex portion or the end portion may be continuous, or discontinuous in one direction (in this instance, the second concave portion or the second convex or end portion may comprise a plurality of separate parts), moreover, it may have a predetermined length.

The housing main body comprises a fourth opening being separated from the second opening by a partition wall and communicating with the third opening. The fourth opening being separated from the second opening by the partition wall is similar to the second opening in communicating with the third opening. Thus, the fourth opening is connected to the second opening via the third opening. In other words, the third opening communicates with the opening parted by the partition wall. The partition wall may be positioned and extend between the second and fourth openings. Both openings may partially communicate with each other if the wall is discontinuous. The height of the wall may be constant or variable, and it may be high or low. The wall may be a part of the housing main body or a separate part, which is put on the housing main body.

The contact is connected with the second lead wire being drawn out from the fourth opening. The contact may be seen through the first opening unless some kind of cover such as a lid could block the view. The cover could be opened when the outside terminal is plugged into the first opening. The moving direction of the second lead wire moving flexibly conforms with the direction where the first lead wire being drawn out from the second opening moves flexibly. The second lead wire may be bent with ease (i.e., flexible in the radial direction of the lead wire), but it may not be stretched much in the axial direction since the lead wire may be composed of a cupper wire. Thus the moving direction of the second lead wire moving flexibly is rather orthogonal to the axial direction of the second lead wire.

The partition wall has the third concave portion in which the third convex or end portion of the door body slides in a similar manner with the relationship between the door body and the housing main body as described before. That is to say, the third concave portion provided on the partition wall may be a concave portion of a groove-like shape by way of example. A convex portion or the like described later can be fitted into a recess of the concave portion. That the third convex or end portion of the door body slides in the third concave portion provided near the third opening may mean that a convex (projecting from surroundings) or end portion of the door body is fitted into a recess of the third concave portion and that it may move smoothly in the concave portion. In this instance, the third concave portion or the third convex or end portion may be continuous, or discontinuous in an extending direction. In this instance, the third concave portion and/or the third convex or end portion are composed of a plurality of parts, respectively. The portion may have a predetermined length.

The door body has the fourth concave portion in which the fourth convex or end portion of the partition wall slides in a similar manner with the relationship between the housing main body and door body. That is to say, the fourth concave portion provided on the door body may be, for example, a concave portion of a groove-like shape. A convex portion or the like described later can be fitted in a recess of the concave portion. That the fourth convex or end portion of the partition wall slides in the fourth concave portion may mean that the convex portion provided near the third opening (a projecting portion from surroundings) or an end portion of a part of the partition wall is fitted in a recess of the fourth concave portion. The convex or end portion may move smoothly in the concave portion. In this instance, the fourth concave portion or the fourth convex or end portion may be continuous, or discontinuous in an extending direction. Thus, the fourth concave portion or the fourth convex or end portion may be composed of a plurality of parts. Moreover, it may have a predetermined length.

A stopping portion for stopping the door body when it covers the housing main body is a portion to halt the movement of the door body being put on. For example, the stopping portion may be a projecting portion or the like to prevent advancement of the door body or the like, but it is not limited to the example. The stopping portion may include what has a function to stop the movement.

A connector main body comprising a housing main body and a housing part covering the housing main body to make a connector may include a part of the connector. The connector main body may constitute a connector main form. By way of example, a housing, a case, a frame and the like may be included. Therefore, the connector may be made by putting another part together with the connector main body. The housing main body is a main part of the housing and it may be called a case. The housing may be made by putting another part together with the housing main body. Covering the housing main body may mean that an opening of the housing main body is to be covered. Therefore, making the connector by covering the housing main body may mean that the connector is made or completed by covering the housing main body at the last stage or a rather late stage close to the last stage. The housing part may be a part covering the housing main body and may include anything of any shape such as a plate-like form, a spherical shape, a box-like shape, and so on. The housing part may be able to cover the opening of the housing main body by its body part. A moving direction of the housing part (hereinafter "housing part moving direction") may be a direction of movement of the housing part which closes the third opening so as to cover the housing main body. The housing part moving direction may be a direction of the movement of the housing part being put on. Further, it may be a moving direction of the housing part when the housing part is to be removed. A direction widening the second opening (hereinafter "widening direction") may be a direction substantially parallel to a plane of the second opening and/or a direction substantially contained in the plane defined by a peripheral portion prescribing the second opening of the housing main body. Therefore, the direction may be any direction if it is within the plane. That the housing part moving direction is substantially orthogonal to the flexibly moving direction may mean that a direction of the movement of the housing part covering the housing main body is substantially orthogonal to the widening direction. In this way, the force in the widening direction does not work effectively to separate the housing part from the housing main body.

For example, the fifth concave portion provided on the housing part may be a concave portion of a groove-like shape of the housing part, and a convex portion or the like described later may be fitted in a recess of the concave portion. That the fifth convex or end portion of the housing main body slides in the fifth concave portion may mean that the convex portion (a projecting portion from surroundings) provided near the third opening or an end portion of a part of the housing main body is fitted in the recess of the aforementioned fifth concave portion so as to move smoothly in the concave portion. In the instance, the fifth concave portion or the fifth convex or end portion may be continuous, or discontinuous in an extending direction (in the discontinuous instance, the fifth concave portion, or the fifth convex portion or end portion may be composed of a plurality of separate parts), moreover, it may have a predetermined length.

For example, the sixth concave portion provided on the housing main body may be a concave portion of a groove-like shape of the housing main body, and a convex portion or the like described later may be fitted in a recess of the concave portion. That the sixth convex or end portion of the housing part slides in the aforementioned sixth concave portion provided near the third opening may mean that the convex portion (a projecting part from surroundings) or an end portion of the housing part is fitted in a recess of the aforementioned sixth concave portion so as to move smoothly in the concave portion. In this instance, the sixth concave portion or the sixth convex or end portion may be continuous, or discontinuous in an extending direction (in the discontinuous instance, the sixth concave portion, or the sixth convex or end portion may be composed of a plurality of separate parts), moreover, it may have a predetermined length.

The aforementioned partition wall has the seventh concave portion in which the seventh convex or end portion of the housing part slides in a similar manner with the relationship between the housing part and the housing main body. That is to say, the seventh concave portion provided on the partition wall may be, for example, a concave portion of a groove-like shape of the partition wall. A convex portion or the like described later can be fitted in a recess of the concave portion. That the seventh convex or end portion of the housing part slides in the aforementioned seventh concave portion provided near the third opening may mean that the convex portion (a projecting portion from surroundings) or an end portion of a part of the housing part is fitted in the recess of the aforementioned seventh concave portion so as to move smoothly in the concave portion. In this instance, the seventh concave portion or the seventh convex or end portion may be continuous, or discontinuous in an extending direction (in the discontinuous instance, the seventh concave portion, or the seventh convex portion or end portion may be composed of a plurality of separate parts), moreover, it may have a predetermined length.

The aforementioned housing part has the eighth concave portion in which the eighth convex or end portion of the partition wall slides in a similar manner with the relationship between the aforementioned housing main body and the aforementioned housing part. That is to say, the eighth concave portion provided on the housing part may be, for example, a concave portion of a groove-like shape of the housing part. A convex portion or the like described hereinafter can be fitted in a recess of the concave portion. That the eighth convex or end portion of the partition wall slides in the aforementioned eighth concave portion may mean that the convex portion (a projecting portion from surroundings) provided near the third opening or an end portion of a part of the partition wall is fitted in the recess of the aforementioned eighth concave portion so as to move smoothly in the concave portion. In this instance, the eighth concave portion or the eighth convex or end portion may be continuous, or discontinuous in an extending direction (in the discontinuous instance, the eighth concave portion, or the eighth convex portion or end portion may be composed of a plurality of separate parts), moreover, it may have a predetermined length.

A stopping portion for stopping the housing part when it covers the housing main body is a portion to halt the movement of the housing part being put on. For example, the stopping portion may be a projecting portion or the like to prevent advancement of the housing part or the like, but it is not limited to the example. The stopping portion may include what has a function to stop the movement.

Covering the housing main body on the predetermined dividing plane positioned between the contact for connecting to the outside terminal and the cable drawn out from the second opening may mean that an imaginary plane dividing the housing main body and the housing part is positioned between the contact and the cable and that the moving direction of the housing part (hereinafter "housing part moving direction") when the housing part covers the housing main body by closing the third opening is along the imaginary plane. The imaginary plane can include not only a flat plane but also a curved plane and a bent plane with an edge. Therefore, the housing part moving direction usually may show a prescribed relation to the imaginary plane. A direction separating the cable and the contact usually refers to a direction of a straight line connecting the cable and the contact, but the separating direction is not limited to such direction. Thus, a direction of force causing to separate the cable from the contact may be included by the separating direction.

That the housing part covers the housing main body by closing the third opening separated from the second opening may mean that the third opening is independent from the second opening so that the force to widen the second opening does not affect the third opening much and that the housing part can close the third opening.

That the housing main body is a hexahedron like a so-called box, that the contact is arranged on a first face thereof, that the second opening is arranged on a second face thereof, and that the third opening is arranged on a third face thereof may mean that the housing main body or the housing itself (a combined body with the housing main body and one or more other parts) has a box-shaped six-face body, that one of the six faces is a face having an opening not being covered with a face material, that another face is arranged with the contact, that yet another face has the second opening, and that another face may have the third opening, respectively. In this way, it is possible to sufficiently use the functions of the connector by utilizing the three faces.

The connector according to the present invention can be connected to an outside terminal. When the contact is connected to the outside terminal, the connector may be restrained mechanically by the outside terminal via the contact being fixed mechanically by the outside terminal. The mechanical restraint hereby may mean that at least one of the degrees of freedom the connector has can be restrained to some extent or that the connector is pinned with the degree of rotation freedom or that the connector may be fixed completely. The way that the contact is fixed to the connector or the housing main body may include a mechanical fastening such as a screwing, fitting, etc., and may be a mechanical restraint retaining the degree of movement freedom to some extent.

That the housing part moving direction is substantially orthogonal to the pulling direction for unplugging the connector from the outside terminal when the housing main body is covered by closing the third opening with the housing part may be that the force direction to remove the connector being substantially parallel to the pulling direction of the connector from the outside terminal is substantially orthogonal to the housing part moving direction so that removing the connector from the outside terminal does not influence much the operation to close or open the third opening of the housing part.

DETAILED DESCRIPTION OF THE PREFERRED EMBODIMENT

Figure 1A:
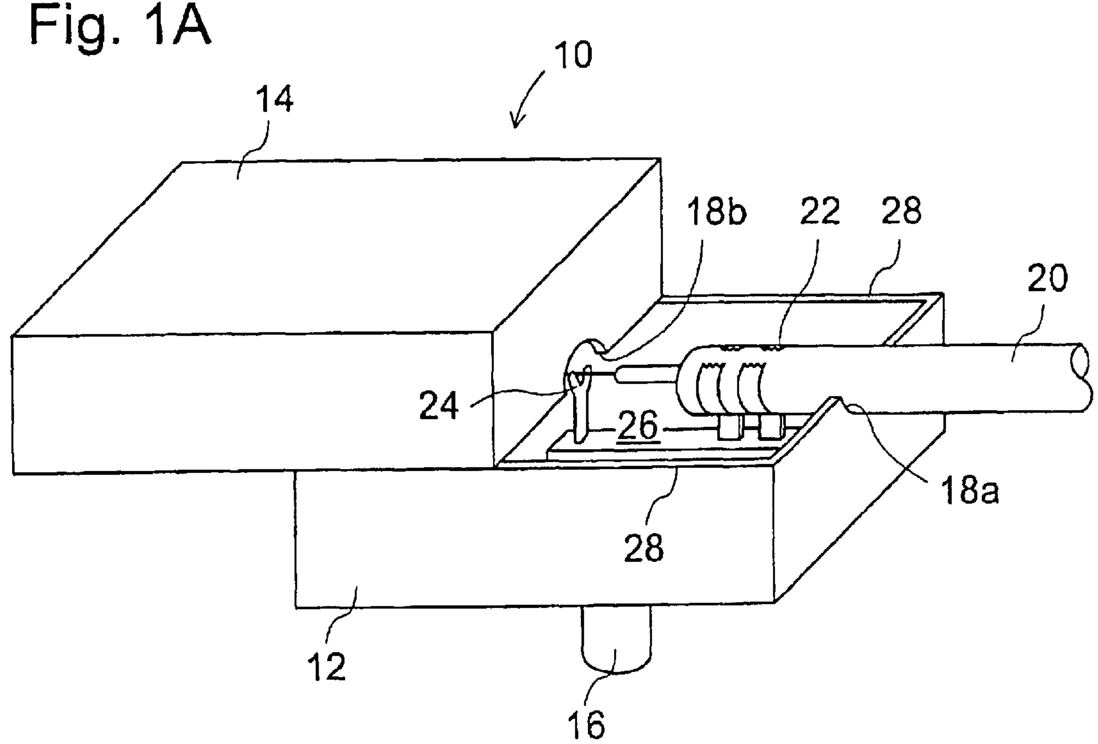
FIG. 1A is a perspective view showing a first embodiment according to the present invention.

Preferred embodiments according to the present invention are now explained in detail by referring to the drawings. Although the embodiments employ concrete shapes, materials and the like as preferable examples according to the present invention, it should be understood that the present invention is not limited to such embodiments.

Figure 1B:
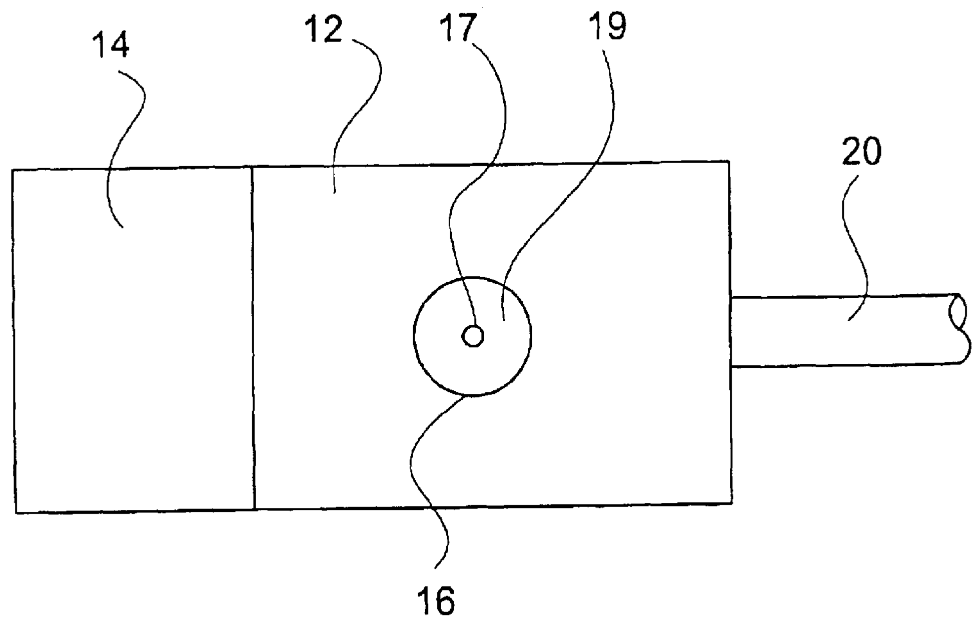
FIG. 1B is a bottom view of the first embodiment in FIG. 1.

FIG. 1A shows a connector main body or a connector 10 according to the first embodiment of the present invention. FIG. 1B shows a bottom view of the connector 10 in FIG. 1A. The connector 10 is comprised of a connector main body including a housing main body 12 and a housing part 14 located on the top of the housing main body 12; a contact 16; a cable 20 (including a lead wire); and a cable holding portions 22, 24, 26 connecting and fixing the cable 20 to the connector 10. The cable holding portions are composed of a holding member 22 pinching the cable main body and connecting an earth wire to the connector, a signal terminal 24 connecting a signal line, and a platform 26 fixing the holding member 22 and the signal terminal 24 to the connector. The cable 20 passes through an opening 18, as an example of the second opening, composed of a semicircular opening 18*a* of the housing main body 12 of the connector 10 and a semicircular opening 18*b* of the housing part 14, and is drawn out from the connector 10. In relation to the housing main body 12, the housing part 14 slides on an upper end side 28 of the housing main body 12 or a plane (as an example of the dividing plane) defined by the upper end side 28 to complete or finish the connector by closing an opening 29, as an example of the third opening, of the housing main body. When the housing part 14 slides on the housing main body as described above, the housing part 14 is constructed such that the housing part may not separate from the housing main body which will be described later in detail. More specifically, the housing part 14 in FIG. 1 can slide only in the left and right directions, but not in a vertical direction so that it may not separate from the housing main body 12. The direction in which the housing part 14 slides rightward is a direction to cover or close the opening 29 so that the connector is covered. On the other hand, the direction in which the housing part 14 sides leftward is a direction to open the opening 29 so that the connector is opened. These two directions are parallel with each other and are moving directions. The opening defined by the upper end side 28 communicates with the semicircular opening 18*a* of the housing main body 12 and also communicates with the semicircular opening 18*b* of the housing part 14. The opening 18 being composed of the openings 18*a* and 18*b* is an example of the aforementioned second opening. The dividing plane of the housing main body 12 and the housing part 14 may form the aforementioned third opening.

When the connector 10 is not covered with the housing part 14, the cable 20 is fixed to a cable holding portion 22 within the connector. The housing part 14 finally slides to the right to cover the third opening to complete the connector 10. At this time, the moving direction of housing part 14 just before the completion is horizontal and rightward in FIG. 1. The completed connector 10 is connected to an outside terminal (not illustrated) with the contact 16, which has a round opening 19 and an inner contact 17 at the center of the opening 19. The housing and the cable 20 near the connector 10 are usually held by a hand together so that an connecting operation is performed by moving the connector 10 rightward-leftward and upward-downward so as to make the contact 16 connected to the outside terminal. Therefore, the cable 20 is moved relative to the housing (especially relative to the opening 18) by the force applied by the hand. However, the movement is restrained by the opening 18 so that the cable 20 exerts force to the periphery of the opening 18 in the widening direction of the opening 18. It is plausible that the pulling force to remove the cable 20 from the connector 10 (or the pushing force to apply to the connector 10) is exerted in a direction, which is substantially orthogonal to the force to widen the opening 18 so that the pulling force may not contribute to widening the opening 18.

When the force as described above acted on the opening 18, the opening 18 is about to be extended, however, the slide mechanism as stated above restricts the movement that housing part 14 is about to separate from the housing main body 12 so that the opening 18 is not spread, and it is difficult to happen that the housing part 14 comes of from the connector 10. Moreover, the slide mechanism allows the housing part 14 to move horizontally from side to side, however, because the direction is substantially orthogonal to the direction of force to spread the opening 18, it is considered that the spreading force is hard to become effective force to slide the housing part 14 to the left (or right).

Figure 2A:
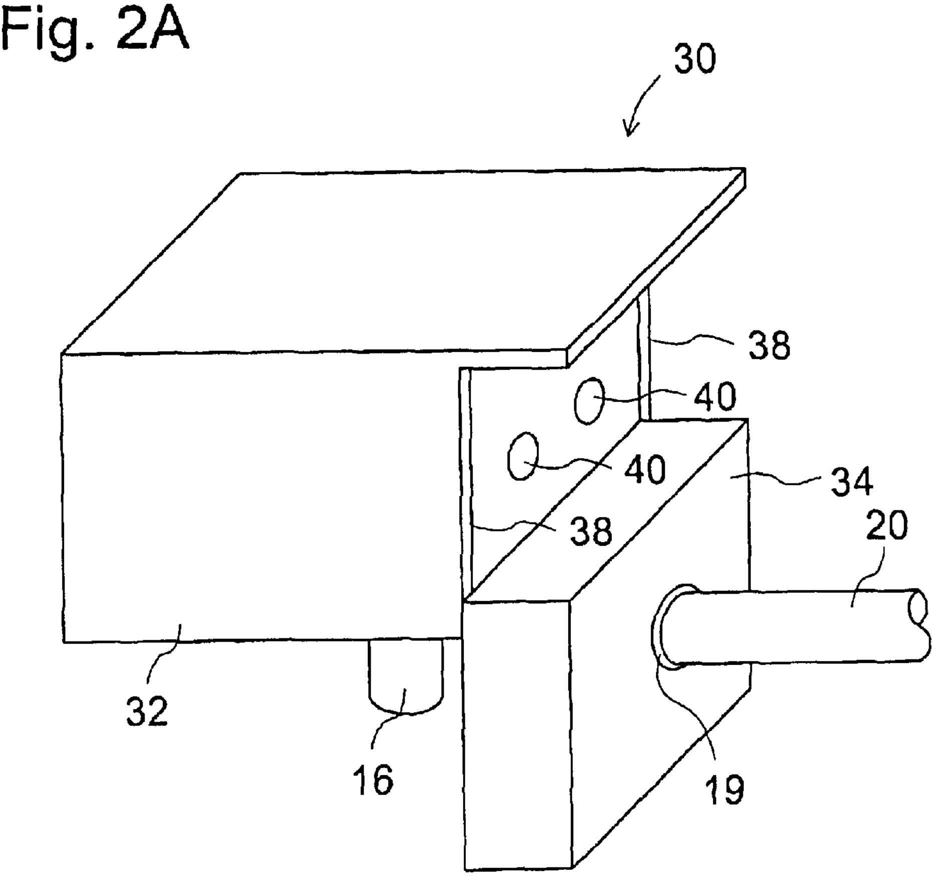
FIG. 2A is a perspective view showing a second embodiment according to the present invention.
Figure 2B:
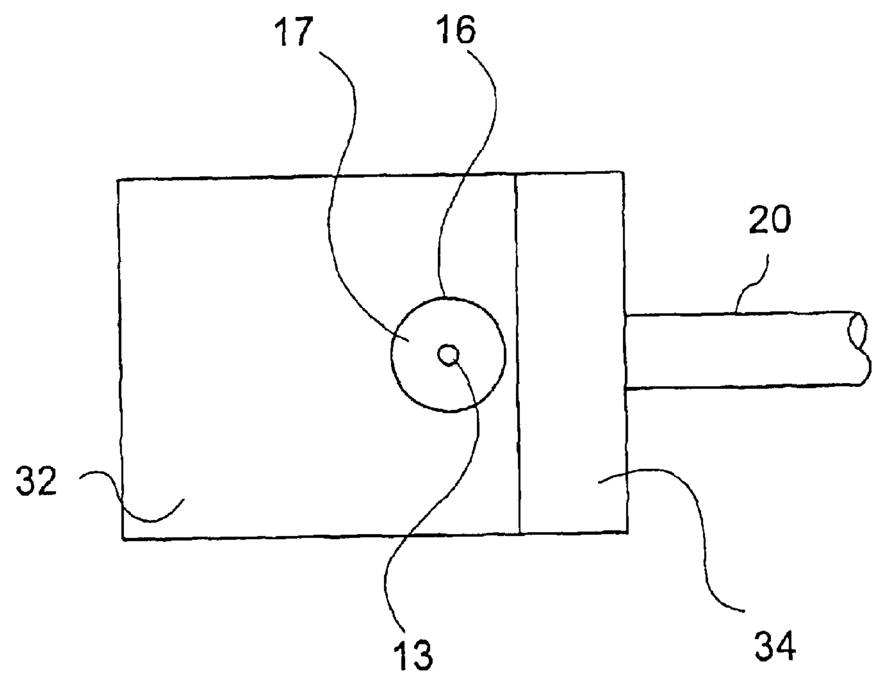
FIG. 2B is a bottom view of the first embodiment in FIG. 2.

FIG. 2A illustrates a connector main body or a connector 30, as a second embodiment according to the present invention. FIG. 2B shows a bottom view of the connector 30 in FIG. 2A. The connector 30 is comprised of a housing main body 32 and a housing part 34, etc. A contact 16 to be connected to an outside terminal is arranged in a lower part of the housing main body 34. An inner contact 17 is arranged at the center of an opening 19 defined by the rim of the contact 16. A right end side 38 of the housing main body 32 defines an opening, as an example of the third opening, and also the dividing plane of the housing main body 32 and the housing part 34. In the opening, there are terminals 40, 40 so as to connect signals from the cable 20 to the contact 16. In a similar manner as the aforementioned first embodiment, the housing part 34 slides to the top along the right end side 38 to complete the connector 30 by closing the opening. The housing part 34 slides upward, and the movement is stopped by hitting an overhung portion of the housing main body 32. Therefore, the overhung portion functions as a stopping portion and also functions as an upper cover of the housing part 34. The second opening 19 is mounted on the housing part 34, and the cable 20 is drawn out therefrom.

When the connector 30 is not covered with the housing part 34, the cable 20 within the housing part is fixed to a cable holding portion (not illustrated), finally making the housing part 34 slide upward to cover the opening (third opening) to complete the connector 30. At this time, a moving direction of the housing part 34 just before completion is vertical and upward in the drawing. The completed connector 30 is connected to an outside terminal (not illustrated) via contact 16. Usually, the housing and a cable 20 near the connector are held by a hand together, and the connecting operation is performed to make the contact 16 connected to the outside terminal while the connector 30 is moved rightward-leftward and upward-downward. Therefore, the cable 20 is moved relative to the housing (especially relative the opening 19) by the force from the hand. However the movement is restrained by the opening 19, and that the cable 20 exerts the force to the circumference of the opening 19 in a widening direction of the opening 19. However, in this embodiment, there is no joint around the opening 19, thus it is very hard to be widened. Moreover, although the force to pull (or to push) the cable 20 from the connector 30 acts thereon, the widening force may not work well because the direction will be substantially orthogonal to the direction of the force to widen the opening 19. However, since the housing part 34 is connected to the housing main body 32 across the dividing plane the separation on the dividing plane is concerned. However in a similar manner as the aforementioned embodiment, it is hard for the housing part 34 and the housing main body 32 to separate from each other since the sliding mechanism prevents the housing part 34 from leaving the housing main body 32. Since the moving direction to cover (or to open) the third opening is substantially orthogonal to the pulling direction of the cable, which is in the same direction as to separate the housing part 34 from the housing main body 32, it is plausible that the force is not so effective to slide the housing part 34 downward (or upward).

Figure 3:
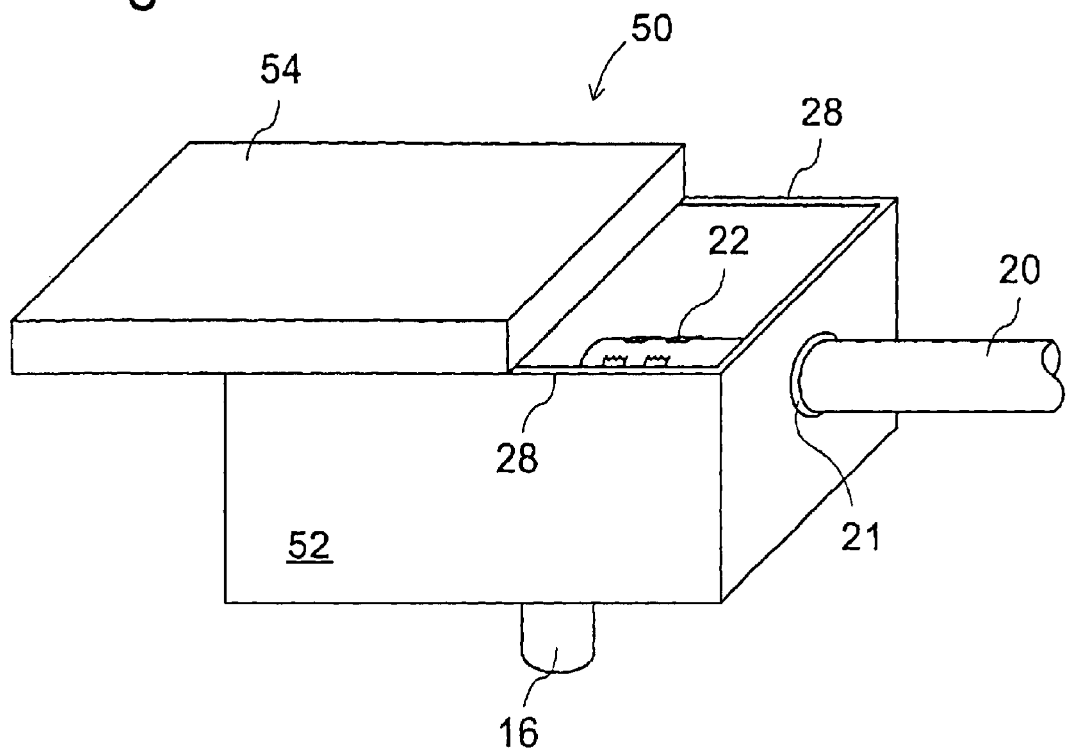
FIG. 3 is a perspective view showing a third embodiment according to the present invention.

FIG. 3 shows the connector main body and connector 50, as a third embodiment according to the present invention. The connector 50 is comprised of a connector main body having a housing main body 52 and a housing part 54 located on the top of the housing main body 52, the contact 16, a cable (including the lead wire) 20, and a cable holding portion connecting and fixing the cable 20 to the connector 50. The cable holding portion is comprised of a holding member 22 pinching a cable main body and connecting an earth wire to the connector 50, a signal terminal connecting signal lines, a platform fixing the holding member 22 and the signal terminal to the connector. The cable 20 passes through a circular opening 21 (an example of the second opening) of the housing main body 52 of the connector 50 and drawn out from the connector 50. The housing part 54 slides on the housing main body 52 along the upper end side 28 of the housing main body 52 or the plane that the upper end side 28 defines (dividing plane) to complete the connector by closing the opening of the housing main body (an example of the third opening). When the housing part 54 slides on the housing main body as described above, the housing part is designed not to be separated from the housing main body as described later in detail. In FIG. 3, the housing part 54 can slide only in the direction of right and left so as not to move upward to separate from the housing main body 52. When the housing part 54 slides rightward, the opening (as the third opening) is covered or closed so that the connector is covered. On the other hand, when the housing part 54 slides leftward, the opening is opened so that the connector is opened. These directions are parallel to each other, and it is the moving direction. The opening defined by the upper end side 28 as the third opening is not spatially communicating with the opening 21 as the second opening of the housing main body 12.

When the connector 50 is not covered with the housing part 54, the cable 20 is fixed to a cable holding portion in the connector 50, and the housing part 54 is slid to the right so as to complete the connector 50 by closing the third opening. In this instance, the moving direction of the housing part 54 just before the completion is horizontal and rightward in the figure. The completed connector 50 is connected to an outside terminal (not illustrated) via the contact 16. Usually, the housing and cable 20 near the connector 50 are held together with a hand, and the plugging operation is performed by moving the connector 50 rightward-leftward and upward-downward so that the contact 16 is connected to the outside terminal. Therefore, the cable 20 is moved relative to the housing (especially, relative to the opening 21) by the force received from the hand. The movement of the cable 20 is restrained by the opening 21 so the cable 20 exerts force to circumference of the opening 21 in a widening direction of the opening 21. However, it is very difficult to widen the opening 21 because there is no joint around the opening 21.

Figure 4:
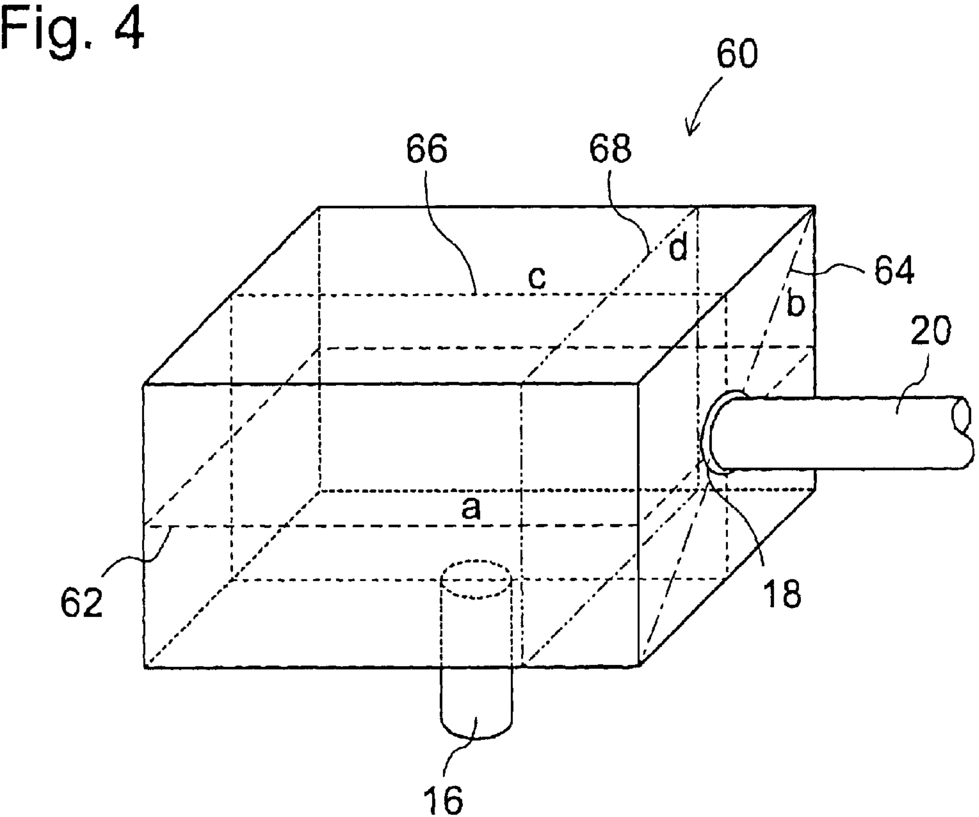
FIG. 4 is a schematic perspective view illustrating first and second embodiments according to the present invention.

A connector 60 according to the present invention is illustrated schematically in FIG. 4. The connector 60 has a housing comprising a housing main body and a housing part. A contact 16 to be connected to an outside terminal is arranged at a bottom face of the housing. An opening 18, as an example of the second opening, is arranged on the right face of the housing, and the cable 20 is drawn out therefrom. In order to illustrate the embodiment schematically, dividing lines are drawn on the housing with a dashed line 62, a one-dotted chain line 64, a dotted line 66, and a two-dotted chain line 68. Each dividing line is a line defining each dividing plane and being viewed from the outside of the housing. The dividing line of the dashed line 62 indicates the case of the first embodiment shown in FIG. 1. The dividing line of the one-dotted chain line 64 and the division line of the dotted line 66 are the cases of modified embodiments from the first embodiment. It is common among the dividing lines that each dividing line reaches the second opening 18. Since each line reaches the second opening 18, the force to widen the opening 18 works as the force to split the housing at the dividing plane. Therefore, in the housing having such dividing plane, the way of assembling (or the way of removing) of the housing main body and the housing part becomes very important. Especially, the first moving direction to remove the housing part from the completed connector is important. It is preferable that the direction of removing is substantially orthogonal to the direction of force to widen the second opening. Because the widening force does not work effectively to remove the housing part. A pulling force of the cable 20 does not work so efficiently to widen the second opening 18 so that the pulling force is not so important with the embodiment.

On the other hand, the dividing line of two-dotted chain line 68 does not reach or cross the second opening 18 so that the connector 60 has the highly durable structure against the force to widen the opening 18. However, the pulling force to pull out the cable 20 passes through the second opening 18 because the opening 18 of the embodiment does not squeeze and fix the cable 20 at the opening. Thus, the pulling force may separate the cable 20 from the contact 16. In this instance, if the dividing plane defined by the dividing line 68 is substantially orthogonal to the separating direction, it is difficult to cause the slip on the dividing plane and it appears to be difficult to split the housing part from the housing main body. It is also important that the cable 20 is fixed mechanically and firmly to the housing part.

Figure 5:
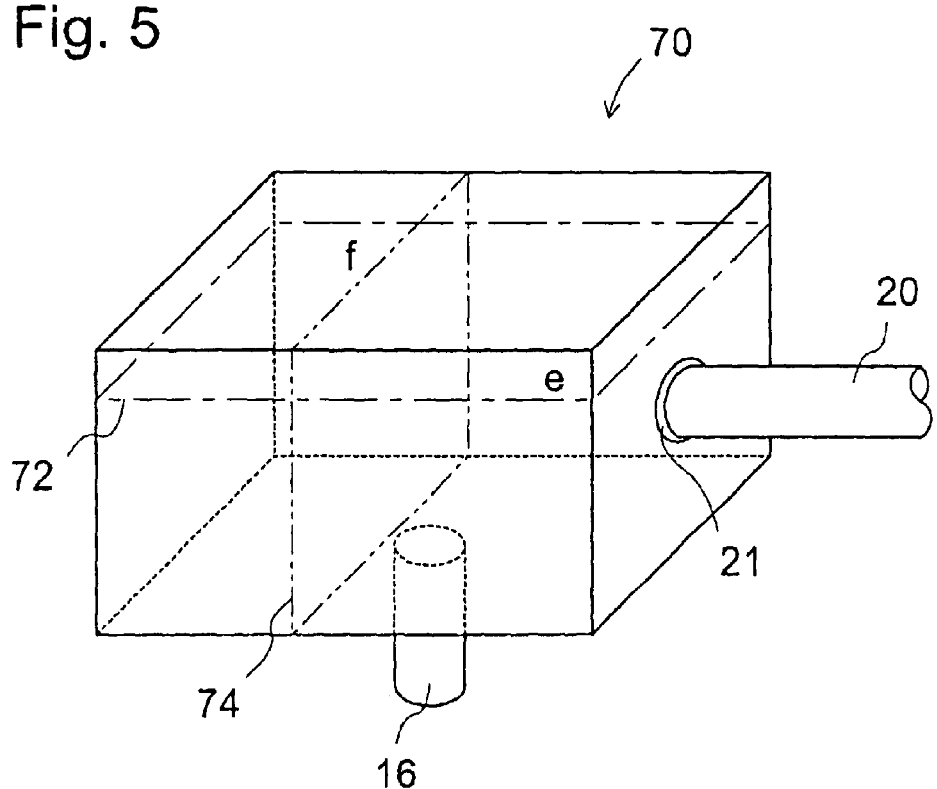
FIG. 5 is a schematic perspective view showing a third embodiment according to the present invention.

FIG. 5 illustrates another embodiment schematically. A connector 70 has a housing being composed of a housing main body and a housing part. And a contact 16 to be connected to an outside terminal is arranged at a bottom face of the housing. An opening 21 (the second opening) is arranged on a right face of the housing, and a cable 20 is drawn out therefrom. On the housing, each dividing line is shown with an one-dotted chain line 72, and a two-dotted chain line 74 in order to illustrate the embodiment schematically. The dividing line is a line viewed from the outside of the housing to define the aforementioned dividing plane. The dividing line of the one-dotted chain line 72 or the dividing line of the two-dotted chain line 74 does not cross the second opening 21 so that the connector 70 has the highly durable structure against the force to widen the opening 21. Further, since the dividing plane defined by either dividing line is not located between the cable 20 and the contact 16, even if the pulling force to pull out the cable 20 passes through the second opening 21 because the opening 18 of the embodiment does not squeeze the cable 20 for fixing, it may not apply on the dividing plane efficiently. FIG. 3 shows an example embodying such case with the dividing line 72.

Figure 6:
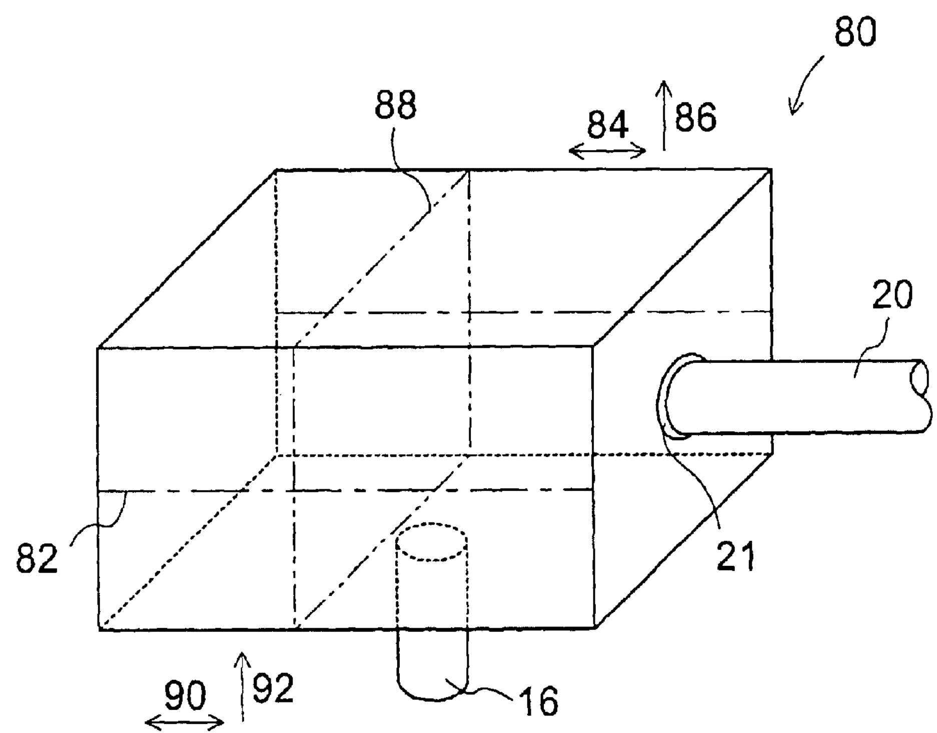
FIG. 6 is a schematic perspective view showing a fourth embodiment according to the present invention.

FIG. 6 illustrates yet another embodiment schematically. A connector 80 has a housing being composed of a housing main body and a housing part. And a contact 16 to be connected to an outside terminal is arranged on the bottom face of the housing. An opening 21 (the second opening) is arranged on a right face of the housing, and a cable 20 is drawn out therefrom. On the housing, each dividing line is shown with an one-dotted chain line 82 and a two-dotted chain line 88 in order to illustrate each embodiment schematically. Each dividing line is a line viewed from the outside of the housing and defines each aforementioned dividing plane. The dividing line of the one-dotted chain line 82 or the dividing line of the two-dotted chains line 88 does not cross the second opening 21 so that the connector may have a highly durable structure against the force to widen the opening 21. Further, since the dividing plane defined by each dividing line is not located between the cable 20 and the contact 16, even if the pulling force to pull out the cable 20 passes through the second opening 21 because the opening 18 of the embodiment does not squeeze the cable 20 for fixing, it appears that the pulling force does not work so efficiently on the dividing plane for the separation. The dividing line 82 crosses horizontally at the middle height of the front and back side faces, goes up along the right and left side edges of the right and left side faces, and extends along the top side edges of the right-side and left-side faces in the figure. The dividing plane is not a flat plane, but is a bent plane with corner edges to cover the upper half of the housing of the connector. The direction of the force to remove the connector 80 from the outside terminal is upward (as shown by an arrow 86) and the direction of assembling or removing the housing part on the aforementioned dividing plane is right-and-left direction (as shown by an arrow 84) so that the two directions are substantially orthogonal to each other. Therefore, it appears that the pulling force to pull out the connector from the outside terminal does not work so effectively to separate the housing part from the housing main body as stated above.

In the case with the diving line 88, the dividing plane is flat. The direction separating the connector 80 from the outside terminal is upward (as shown by an arrow 92). The direction in which the housing part (a left piece from the line 88 in the figure) is assembled with the housing main body or detached from the housing main body can be in the right and left direction (as shown by an arrow 90). The two directions are substantially orthogonal. Therefore it is considered that the pulling force to pull out the connector 80 from the outside terminal is considered not to work so effectively to divide the housing part from the housing main body.

Figure 7:
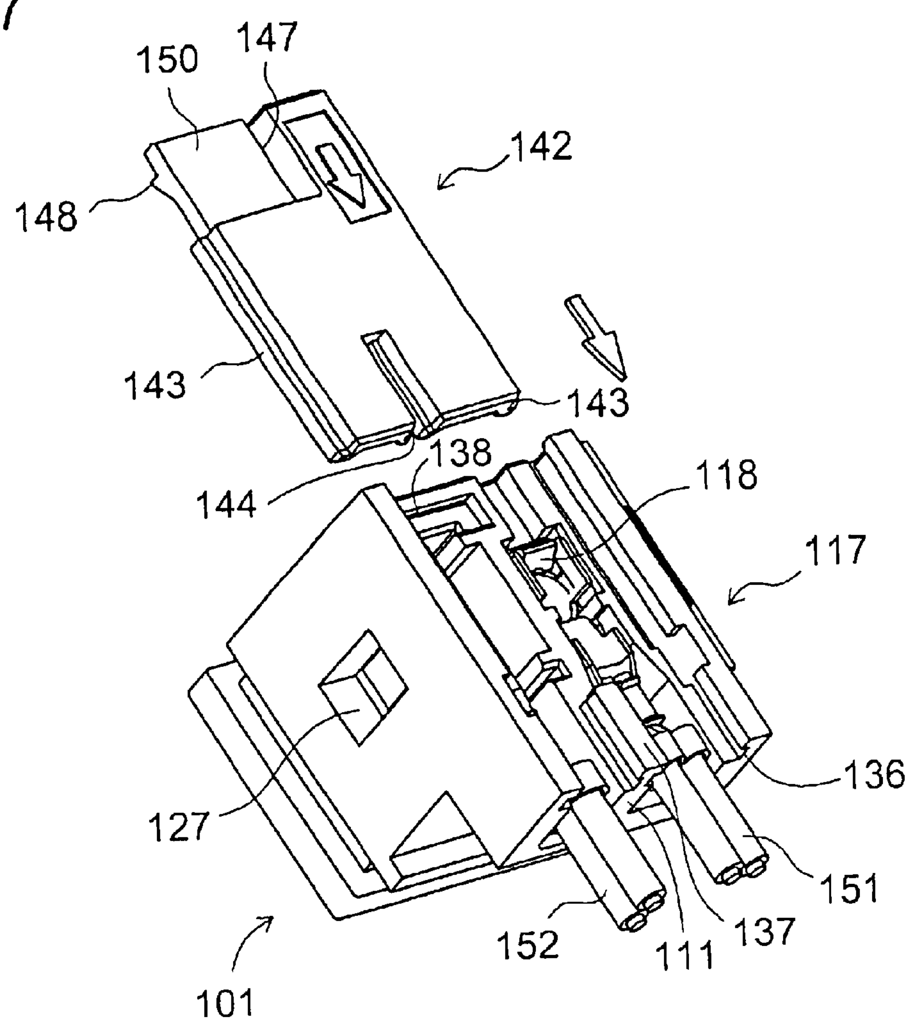
FIG. 7 is a perspective view showing a fifth embodiment according to the present invention.
Figure 8:
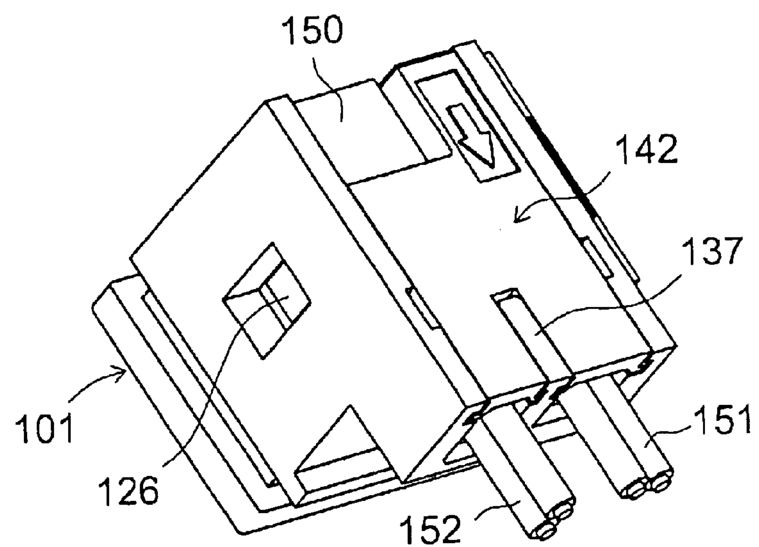
FIG. 8 is a perspective view showing a completed connector by covering the housing in FIG. 7
Figure 9:
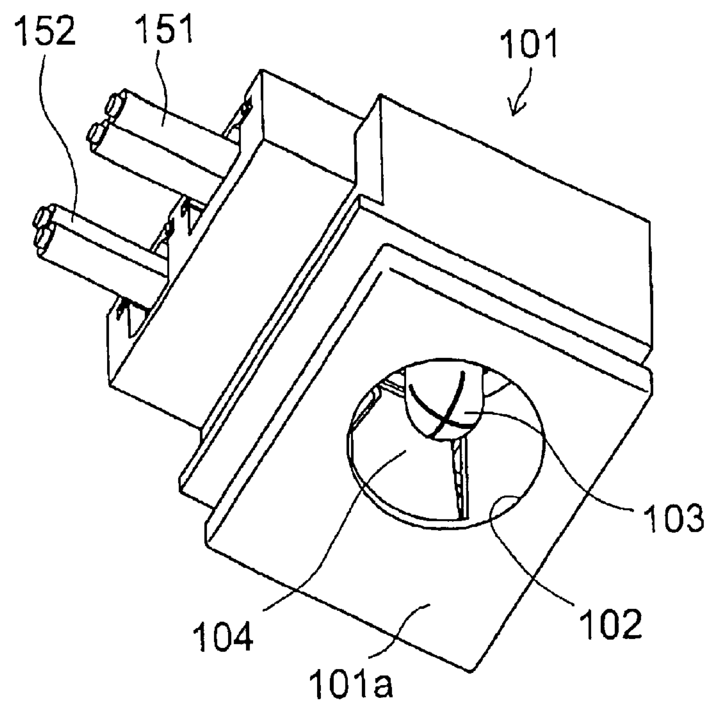
FIG. 9 is a perspective view from another angle showing the completed connector in FIG. 8.
Figure 10:
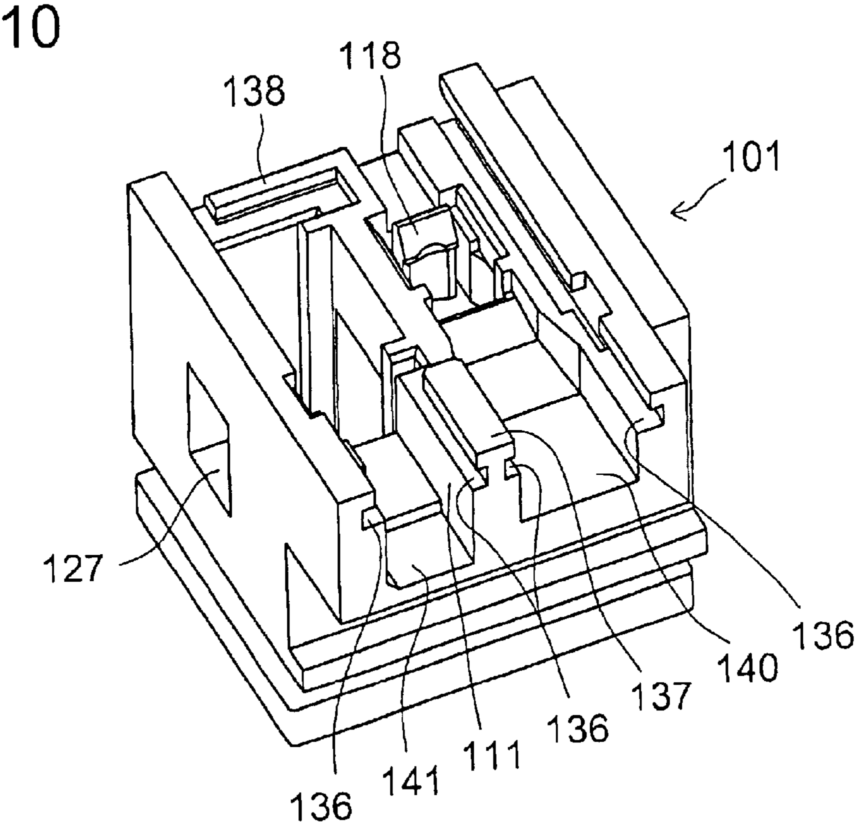
FIG. 10 is a perspective view of the housing main body of the connector in FIG. 7.
Figure 11:
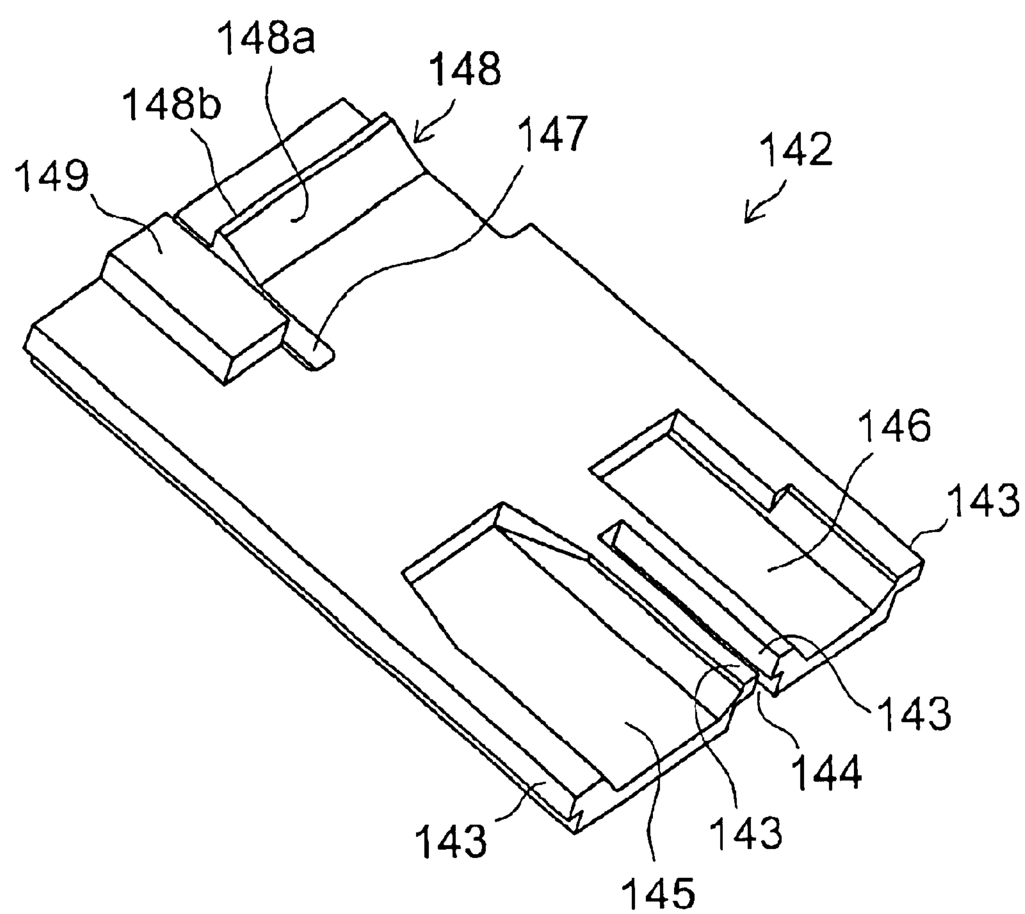
FIG. 11 is a perspective view the cover relating to the fifth embodiment according to the present invention.
Figure 12:
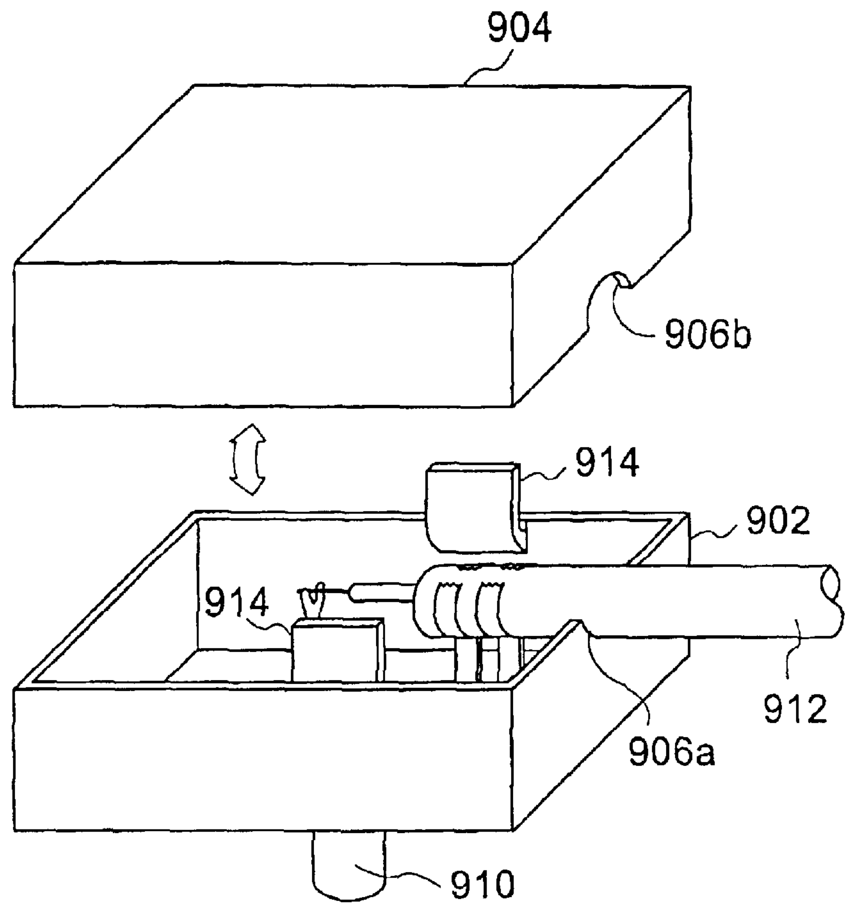
FIG. 12 is a perspective view of a conventional connector from which a cover is removed.
Figure 13:
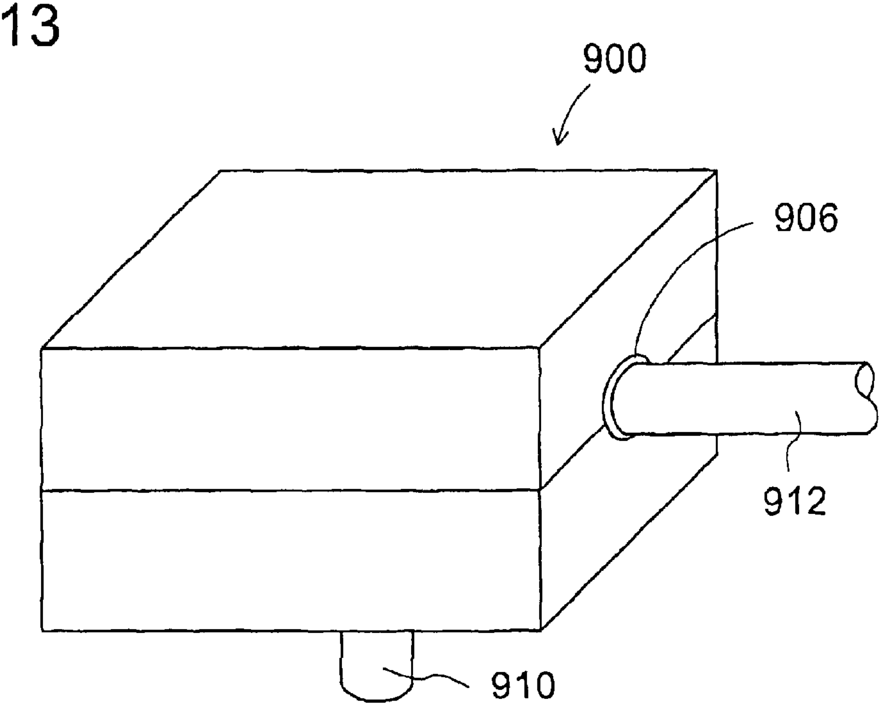
FIG. 13 is a perspective view of the conventional connector.

FIGS. 7 through 11 show a power supply Jack, which is a connector, as another embodiment (the fifth embodiment) according to the present invention. FIG. 7 shows how a cover 142 as an example of the housing part is mounted on a housing main body 101. In the housing main body 101, there is an opening 117 (corresponding to the third opening) on the right upper side face in the figure, and positive and negative contacts 103 and 104 are inserted into predetermined positions in the housing main body through the opening 117, respectively. The positive contact 103 is connected to a lead wire 151 by crimping, and a negative contact 104 is connected to a lead wire 152 by crimping. A lance 126 having a thin chevron-shape cross section extends from the circumference of a window 127 of the housing 101 to hold a negative contact 104. An projecting portion 118 viewed from the opening 117 is a stopping portion for stopping the positive contact 103. If the housing main body 101 in FIG. 7 is viewed from the bottom face, the positive and negative contacts 103,104 can be viewed from an opening 102 (corresponding to the first opening) in the front wall 101*a* (in FIG. 9). The first opening 102 is an insertion hole to insert a plug (corresponding to the outside terminal). When the plug (not illustrated) is inserted in the plug insertion hole 102, the positive and negative contacts are electrically connected to the plug.

In the housing 101, a pair of guide grooves 136 (corresponding to concave portion) along both sides of the third opening 117 is formed. Furthermore, a pair of guide grooves 136 (corresponding to the concave portion) is formed on the stopper 137 (corresponding to the stopping portion) protruding from an upper portion of the separation wall 111 (corresponding to a partition wall) (in FIG. 10). A corner portion 138 performs its function as a stopping portion for stopping the movement in a removing direction of the cover 142 as described later. The cover 142 is a cover closing the opening 117 of the housing main body 101, and the slide projection 143 (corresponding to the convex portion) is formed on the both sides. Slide projections 143 are formed on both side faces opposing each other in the slit 144 provided around a front end of the cover 142 (in FIG. 11). Recessed portions 146, 145 for preventing interference with portions of the positive and negative contacts 103, 104 being made by crimping the lead wires 151, 152 are disposed on the cover 142 across the slit 144. Furthermore, a slit 147 is formed around an end portion of the cover 142, and the stopping portion 148 and the projection 149 are arranged on the cover 142 across the slit 147. When the cover 142 closes the opening 117, it is stopped by the corner portion 138, and the stopping portion 148 prevents the movement in the direction to re-open it from the opening 117 of the cover 142. In order to adjust the spring power to make the latch mechanism of these stopping portions 138, 148 operate appropriately, the thin wall portion 150 of the cover 142 is made thin.

When the cover 142 is put on the housing main body 101, the slide projections 143 are engaged with the guide grooves 136 such that the cover 142 may slide in the direction shown by an arrow as indicated in FIG. 7. When the front end of the cover 142 reaches the stopper 137, the slide projections 143 in the slit 144 engage with the guide grooves 136 of the stopper 137. Such structure may be employed as the slide system which can be used for the embodiment according to the present invention. A slope 148*a* of the stopping portion 148 slides onto the corner portion 138 and a vertical face 148*b* engages with the corner portion 138 so that the reverse movement of the cover 142 is prevented. Further, advancement of the cover 142 is stopped by the stopper 137. Therefore, the cover 142 is fixed in the state where the opening 117 of housing main body 101 is closed (in FIG. 8).

In order to remove the cover 142 from the state where the cover 142 engages with the housing main body 101 (in FIG. 8), the thin wall portion 150 is lifted, the engaged vertical face 148*b* and corner portion 138 are disengaged, and the cover 142 is slid in an opening direction until at least a position where the slope 148*a* is disposed onto the corner portion 138. It is possible to make it difficult to remove the cover 142 by adjusting the wall thickness and width of the thin wall portion 150 by changing the position and other attributions of the slit 147. However, it is also possible to make the housing structure (or the connector main body structure) so that it is easy to attach and detach the cover at any time. Since the cover 142 is attached and detached by a sliding operation as described above, it becomes very difficult to pull off the cover upward from the housing. The lead wires 151, 152 are drawn out from the openings 140, 141 (corresponding to the second and fourth openings) with a large clearance so that they can move up-and-down, right-and-left, and front-and-back. The lead wires 151, 152 can exert force in the directions widening the openings 140, 141, respectively. However, the cover 142 hardly comes off with such force caused by the wire movements since the putting-on-and-removing direction with the slide mounting mechanism is substantially orthogonal to the widening directions of the openings 140, 141 such that the force may not work effectively to remove the cover 142. Further, in the embodiment, since the separation wall 111 separates the second opening 140 from the fourth opening 141 and the guide grooves 136 for engaging with the slide projections 143 of the cover 142 are provided on upper portions of the separation wall 111, the durability against such force to widen the openings becomes even higher.

As described above, based on the analysis of kinds and directions of force acting on the connector when the connector is used, a part of the connector or the connector main body (for example, a door body, cover, etc.) is put on or mounted in the direction substantially orthogonal to the aforementioned directions of force according to the present invention such that the connector or the connector main body is superior in resisting against dividing or disassembling during use. Moreover, even if it is difficult to be disassembled during use, it is possible for the connector to have an attachable and detachable part so that it is superior in repairing and recycling. Moreover, if an appropriate stopping portion is provided in putting a part on, the connector may be assembled with ease and accuracy so that the connector is not broken all of a sudden during use.

What is claimed is:

1. A connector main body of a connector having a first opening for receiving an outside terminal, comprising a housing main body and a door body covering a third opening of the housing main body to make the connector, wherein the housing main body includes:

the first opening of a size and a shape corresponding to a size and a shape of the outside terminal, the outside terminal being contact with a contact, which seen through the first opening, a second opening from which a first lead wire is drawn out, the second opening being open to a substantially orthogonal direction of the first opening, a third opening which communicates with the second opening and is opposite to the first opening, and a fourth opening which is separated from the second opening by a partition wall and communicates with the third opening, the fourth opening being passed through by a second lead wire to be connected to another contact of the connector and being open substantially in parallel with the second opening;

wherein the third opening is defined by opposing edges, each of which has a concave portion along an extending direction of the each edge, which is substantially in parallel with a direction of the first lead wire being drawn out of the second opening, wherein the door body slides over the third opening as each side projection provided on opposing edges thereof engages with corresponding each of the concave portions such that the third opening is closed with the door body, and wherein the partition wall comprises another concave portion at an upper portion thereof such that said another concave portion engages with another projection on a side face of a slit being formed from a leading edge of the door body and substantially in parallel with and between the opposing edges of the door body such that a top face of the partition wall is flush with or above an outer surface of the door body.

2. The connector main body according to claim 1, wherein the partition wall comprises a stopping portion for stopping the door body such that a end side face of the slit hits against the stopping portion when the door body covers the housing main body.

3. The connector main body according to claim 1, wherein the partition wall comprises another stopping portion on an inner surface thereof to prevent the door body from sliding back when the door body covers the housing main body.

4. The connector main body according to claim 2, wherein the partition wall comprises another stopping portion on an inner surface thereof to prevent the door body from sliding back when the door body covers the housing main body.

5. The connector main body according to claim 1;

wherein the housing main body is a box-shaped hexahedron body;

wherein the contact is arranged on a first face thereof;

wherein the second opening is arranged on a second face thereof and;

wherein the third opening is arranged on a third face thereof.

6. A connector having the connector main body according to claim 1;

wherein the contact, when the connector is connected to the outside terminal, is mechanically restrained by the outside terminal, and the housing main body is mechanically restrained by the outside terminal through the contact.

7. A connector having the connector main body according to claim 5;

wherein the contact, when the connector is connected to the outside terminal, is mechanically restrained by the outside terminal, and the housing main body is mechanically restrained by the outside terminal through the contact.

8. The connector main body according to claim 3, wherein said another stopping portion comprises a bump on the inner surface of the door body, the bump including a slope and a vertical face such that a corner portion of an engaging part of the housing main body slides on the slope and engages with the vertical face.

9. The connector main body according to claim 8, wherein the door body comprises a thin wall portion having the inner surface on which the bump is disposed, the thin wall portion being separated from other wall portions of the door body by another slit being formed from a trailing edge of the door body and substantially in parallel with and between the opposing edges of the door body.

10. The connector main body according to claim 1, wherein the door body comprises a recessed portion on an inner surface near the leading edge of the door body such that the second opening has an extra space when the door body closes the second opening.

11. The connector main body according to claim 1, wherein the door body comprises a recessed portion on an inner surface near the leading edge of the door body such that the fourth opening has an extra space when the door body closes the second opening.

12. The connector main body according to claim 10, wherein the door body comprises another recessed portion on an inner surface near the leading edge of the door body such that the fourth opening has an extra space when the door body closes the second opening.

13. The connector main body according to claim 2, wherein the door body comprises a recessed portion on an inner surface near the leading edge of the door body such that the second opening has an extra space when the door body closes the second opening.

14. The connector main body according to claim 2, wherein the door body comprises a recessed portion on an inner surface near the leading edge of the door body such that the fourth opening has an extra space when the door body closes the second opening.

15. The connector main body according to claim 3, wherein the door body comprises a recessed portion on an inner surface near the leading edge of the door body such that the second opening has an extra space when the door body closes the second opening.

16. The connector main body according to claim 3, wherein the door body comprises a recessed portion on an inner surface near the leading edge of the door body such that the fourth opening has an extra space when the door body closes the second opening.

17. The connector main body according to claim 8, wherein the door body comprises a recessed portion on an inner surface near the leading edge of the door body such that the second opening has an extra space when the door body closes the second opening.

18. The connector main body according to claim 8, wherein the door body comprises a recessed portion on an inner surface near the leading edge of the door body such that the fourth opening has an extra space when the door body closes the second opening.

19. A connector having a first opening for receiving an outside terminal, comprising a housing main body and a door body covering a third opening of the housing main body to make the connector, wherein the housing main body includes:

the first opening of a size and a shape corresponding to a size and a shape of the outside terminal, the outside terminal being contact with a contact, which is seen through the first opening, a second opening from which a first lead wire is drawn out, the second opening being open to a substantially orthogonal direction of the first opening, a third opening which communicates with the second opening and is opposite to the first opening, and a fourth opening which is separated from the second opening by a partition wall and communicates with the third opening, the fourth opening being passed through by a second lead wire to be connected to another contact of the connector and being open substantially in parallel with the second opening;

wherein the third opening is defined by opposing edges, each of which has a concave portion along an extending direction of the each edge, which is substantially in parallel with a direction of the first lead wire being drawn out of the second opening, wherein the door body slides over the third opening as each side projection provided on opposing edges thereof engages with corresponding each of the concave portions such that the third opening is closed with the door body, and wherein the partition wall comprises another concave portion at an upper portion thereof such that said another concave portion engages with another projection on a side face of a slit being formed from a leading edge of the door body, and substantially in parallel with and between the opposing edges of the door body such that a top face of the partition wall is flush with or above an outer surface of the door body.

20. The connector according to claim 19, wherein the partition wall comprises a stopping portion for stopping the door body such that a end side face of the slit hits against the stopping portion when the door body covers the housing main body.

21. The connector main body according to claim 19, wherein the partition wall comprises another stopping portion on an inner surface thereof to prevent the door body from sliding back when the door body covers the housing main body.

22. The connector main body according to claim 20, wherein the partition wall comprises another stopping portion on an inner surface thereof to prevent the door body from sliding back when the door body covers the housing main body.

* * * * *